Figure 1:
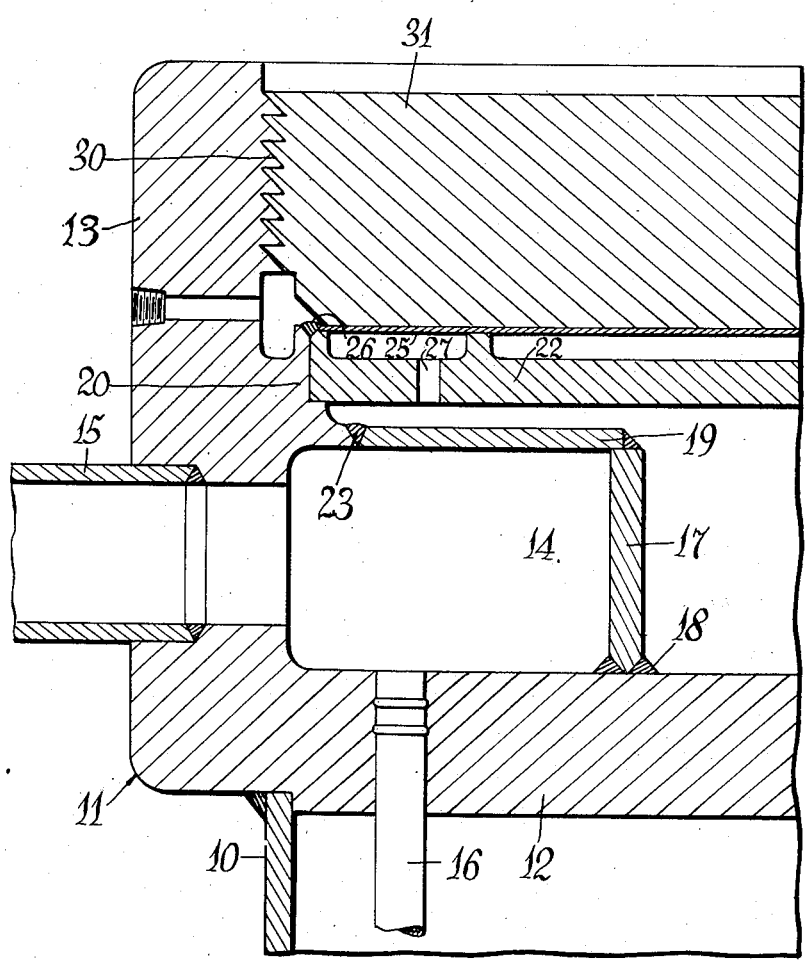

May 26, 1959

T. TINKER 2,888,249

HIGH PRESSURE CLOSURE

Filed Sept. 26, 1955

2 Sheets-Sheet 1

INVENTOR.
TOWNSEND TINKER
BY
Beau, Brooks, Buckley & Beau,
ATTORNEYS.

May 26, 1959 T. TINKER 2,888,249
HIGH PRESSURE CLOSURE
Filed Sept. 26, 1955 2 Sheets-Sheet 2
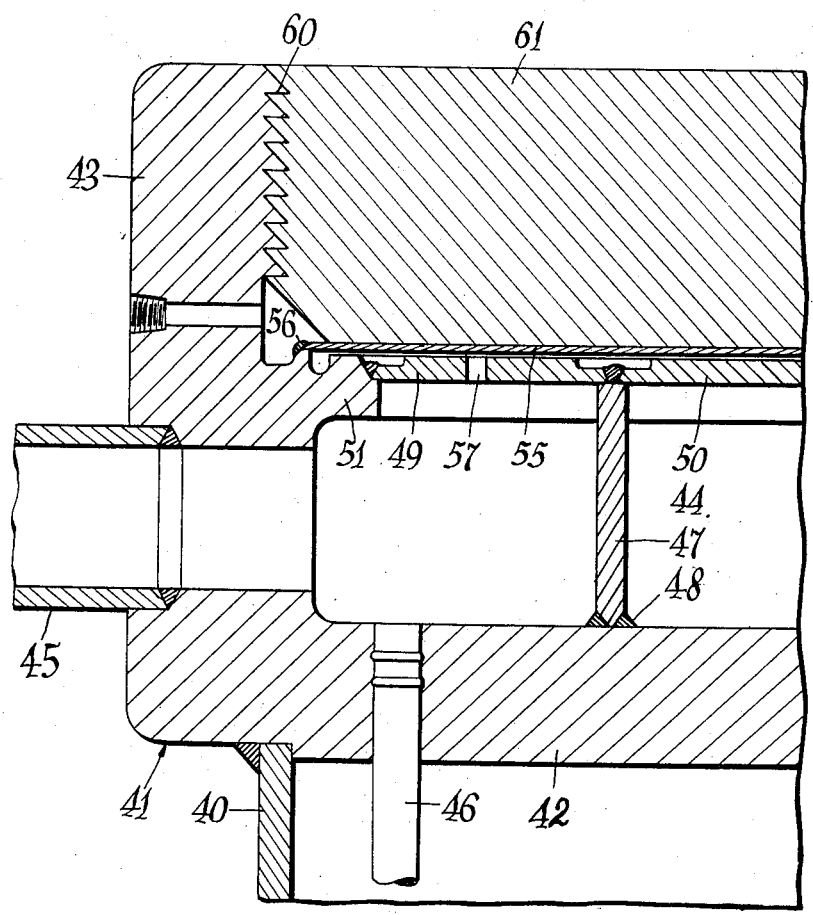
INVENTOR:
TOWNSEND TINKER
BY
Beau, Brooks, Buckley & Beau,
ATTORNEYS.

United States Patent Office 2,888,249
Patented May 26, 1959

2,888,249

HIGH PRESSURE CLOSURE

Townsend Tinker, Orchard Park, N.Y., assignor, by mesne assignments, to American Radiator & Standard Sanitary Corporation, New York, N.Y., a corporation of Delaware Application September 26, 1955, Serial No. 536,697

12 Claims. (Cl. 257—221)

This invention relates to closures for pressure vessels and more particularly to covers or closure members for high pressure heads for heat exchangers and similar apparatus.

The problem of sealing vessels against high internal pressures by means of removable closure heads or covers presents many problems and has been the subject of much development and experimentation. The extremely high internal pressures frequently encountered presents a considerable problem in maintaining an adequate seal and transmitting and distributing the stresses resulting from such high internal pressures.

Because of the complexity and difficulty of the general problem, such closure or cover members have become increasingly complex. It is recognized as advantageous to separate or divorce, to some extent, the fluid seal means from the structural load-bearing portion of the closure means, so that the main hydrostatic pressure load against the latter does not act against the fluid seal means.

In recognition of this desirability and in providing high pressure closures with that end in view it is frequently proposed and practiced to employ multiple closures wherein, generally speaking, an inner closure member provides a hermetic seal against leakage and a separate outer closure member bears the hydrostatic load applied to the closure means by the internal fluid pressure forces in the vessel.

The present invention provides a high pressure closure wherein the advantages of transmitting the hydrostatic pressure load to the main body of the vessel independently of and without burdening the fluid seal is made available in a simple, practical and economical manner and in an arrangement whereby the pressure fluid which is sealed by the closure means is isolated from the portion of the closure which transmits the pressure load to the body of the vessel.

The present invention provides a welded seal closure construction which dispenses entirely with the usual screw devices which ordinarily enter into closure means of this general class in prior art constructions and designs. The closure of the present invention further dispenses with the non-metallic gaskets and sealing devices ordinarily required in high pressure closures.

Dispensing with screw and bolt devices and the accompanying screw holes and bolt holes permits the vessel proper and the cover or closure components to be of minimum and symmetrical proportions for maximum structural strength and economy of design since these parts are not weakened by the usual screw or bolt holes.

In the closure of the present invention the fluid seal is effected by an inner cover or closure member which is welded with respect to the vessel body or vessel end member. Furthermore, the external load bearing closure or cover member is arranged to receive the hydrostatic pressure load and transmit the same to the vessel body without exposure to the pressure fluid.

In the construction of the present invention the inner cover or closure member is of the balanced pressure type wherein equal pressures obtain at its inner and outer sides and a relatively thin diaphragm between the inner and outer cover transmits the hydrostatic pressure load from the interior of the vessel to the outer load bearing cover member. The diaphragm is provided with a welded annular seal which entirely encloses the outer side of the inner cover member to effectively seal the inner cover member and the fluid at opposite sides thereof from egress.

The general arrangement of the present invention is embodied herein in two forms, in one of which the usual pass sealing means, in the form of pass rib or pass plate seals, is independent of the inner cover member and in another embodiment of which the pass rib is sealed or covered by the inner cover member.

While several specific embodiments of the principles of the present invention are illustrated in the accompanying drawings and described in detail herein by way of example, it is to be understood that the scope of the invention is not necessarily limited thereto or otherwise than as defined in the appended claims.

In the drawings:

Fig. 1 is a fragmentary cross sectional view taken longitudinally through a corner of a pressure vessel provided with one form of the closure of the present invention; and Fig. 2 is a similar view of another embodiment of the closure of the present invention.

In the case of both embodiments the drawings illustrate what may be considered to be the upper left-hand corners of cylindrical pressure vessels whose axes extend vertically as viewed in the drawings.

Referring particularly to Fig. 1 the vessel there shown fragmentarily has a main hollow cylindrical body portion 10 and a head member welded to the upper end thereof, the head member being designated generally by the numeral 11 and comprising a radial wall portion 12 which in the present instance provides a tube sheet for a tube type heat exchanger. The head member 11 further includes a cylindrical portion 13 which extends axially outwardly from the pressure vessel proper (upwardly as viewed in Fig. 1).

Pressure fluid such as high pressure water or superheated steam may enter the head space 14 by way of an inlet conduit 15 and the numeral 16 designates, merely by way of example, one of the usual plurality of tubes fixed in tube sheet 12. A conventional pass plate or pass rib 17 is welded within the head space 14 as at 18, to divide the head space into inlet and outlet portions, the division of the head space being completed by a marginally welded semicircular pass rib or pass plate cover or seal 19. All of the foregoing is generally conventional construction in high pressure heat exchanger vessels of this general class and is well known to those skilled in the art to which the present invention relates.

The novel high pressure closure means in the form illustrated by way of example in Fig. 1 will now be described. The interior of the cylindrical portion 13 of the head member 11 outwardly of the head space 14 is provided with an internal flange or rib formation 20 which provides an annular seat or ledge for a back-up plate or inner cover member 22. Annular flange or rib 20 also furnishes convenient anchorage for the arcuate marginal portion of pass rib seal plate 19 which is welded thereto, as clearly shown at 23 in Fig. 1.

A diaphragm 25 overlies inner cover member 22 and is welded about its margin to the surrounding upper edge portion of annular rib or flange 20 as at 26. Inner cover member 22 is provided with an opening or openings 27 by reason of which equal hydrostatic pressures prevail above and below the cover member 22. Diaphragm 25 and its marginal weld connection 26 with flange 20 of the head member 11 provide a hermetic seal for head space 14 and the space both above and below inner cover member 22.

The interior of cylindrical portion 13 of the head member 11 outwardly of flange 20 is provided with internal buttress threads as at 30 in Fig. 1 and a rigid outer cover member 31 is peripherally threaded to engage the internal threads 30. Outer cover member 31 is screwed into position so that its inner radial surface substantially abuts the upper surface of diaphragm 25. It will be noted that the thread connection of cover member 31 is outside of and protected from the pressure fluid in the vessel by the hermetic seal formed by diaphragm 25 and its welded connection 26.

Referring now to the embodiment illustrated in Fig. 2, the main distinctions as compared with the previously described embodiment of Fig. 1 are, first, that the diaphragm back-up plate or inner cover member is combined with the pass rib seal plate and, second, that the back-up plate and the diaphragm are independently welded to the internal flange of the cylindrical portion of the head of the pressure vessel, although these elements are in the same relative positions as in Fig. 1.

The vessel shown fragmentarily in Fig. 2 has a main hollow cylindrical body portion 40 and a head member designated generally by the numeral 41. As in Fig. 1, a radial wall portion 42 provides a tube sheet for a tube type heat exchanger. The head member 41 also includes an outwardly extending cylindrical portion 43 and pressure fluid such as high pressure water or superheated steam may enter the head space 44 thus formed by way of an inlet conduit 45, the numeral 46 designating one of the usual plurality of tubes fixed in tube sheet 12.

A pass plate or pass rib 47 is welded within the head space 44 as at 48, to divide the head space into inlet and outlet portions, the division of the head space being completed by a pair of marginally welded semi-circular plates 49 and 50 which serve also as a back-up plate for the diaphragm, in a manner which will presently appear.

The interior of the cylindrical portion 43 of the head member 41 outwardly of the head space 44 is provided with an internal flange or rib formation 51 which provides an annular seat or ledge for the back-up plate and pass rib seal plate structure 49, 50.

A diaphragm 55 overlies the back-up plate structure 49, 50 and is welded about its margin to the surrounding upper edge portion of annular rib or flange 51 as at 56. The back-up plate structure 49, 50 is provided with an opening or openings 57 by reason of which equal hydrostatic pressures prevail above and below the same. Diaphragm 55 and its marginal weld connection 56 with flange 51 of the head member 41 provide a hermetic seal for head space 44 and the space both above and below the back-up plate structure 49, 50.

The interior of cylindrical portion 43 of the head member 41 outwardly of flange 51 is provided with internal buttress threads as at 60 in Fig. 2 and a rigid outer cover member 61 is peripherally threaded to engage the internal threads 60. Outer cover member 61 is screwed into position so that its inner radial surface substantially abuts the upper surface of diaphragm 55. It will be noted that the thread connection of cover member 51 is outside of and protected from the pressure fluid in the vessel by the hermetic seal formed by diaphragm 55 and its welded connection 56.

Access to the interiors of the pressure vessels shown in Figs. 1 and 2 is attained by unscrewing the outer cover members and removing or breaking the relatively light welds which seal the diaphragms and inner cover members, as by chipping out the welds. The inconvenience of this weld removal is outweighed by the simplicity, economy and general effectiveness of the closure arrangement shown and described herein.

I claim:

1. Pressure vessel means comprising a hollow cylinder having an open end and closure means therefor, said vessel having an outwardly facing ledge spaced axially inwardly of the open end thereof, a diaphragm welded marginally to said ledge to seal the interior of said vessel from the space outwardly of said ledge, a diaphragm back-up plate supported by said ledge immediately inwardly of said diaphragm and passage means in said back-up plate to equalize fluid pressure at opposite sides thereof, an outer cover member and interfitting means acting between the outer cover member and said vessel to transmit outward pressure forces acting against the outer cover member to said vessel, said outer cover member being in abutment with said diaphragm substantially throughout the outer surface of the latter whereby the internal fluid pressure force against the closure means is borne substantially entirely by the outer cover member.

2. Pressure vessel means comprising a hollow cylinder having an open end and closure means therefor, said vessel having an outwardly facing ledge spaced axially inwardly of the open end thereof, a diaphragm welded marginally to said ledge to seal the interior of said vessel from the space outwardly of said ledge, a diaphragm back-up plate supported by said ledge immediately inwardly of said diaphragm and passage means in said back-up plate to equalize fluid pressure at opposite sides thereof, an outer cover member having peripheral threaded engagement with said hollow cylinder at its open end, said outer cover member being in abutment with said diaphragm substantially throughout the outer surface of the latter whereby the internal fluid pressure force against the closure means is borne substantially entirely by the outer cover member and transmitted to the vessel by said threaded engagement.

3. Pressure vessel means comprising a hollow cylinder having an open end and closure means therefor, a diaphragm welded marginally to the interior of said hollow cylinder inwardly of the open end thereof to seal the interior of said vessel, a diaphragm back-up plate likewise welded to the interior of said hollow cylinder and disposed immediately inwardly of said diaphragm, passage means to equalize fluid pressure at opposite sides of said back-up plate, an outer cover member and interfitting means acting between the outer cover member and said vessel to transmit outward pressure forces acting against the outer cover member to said vessel, said outer cover member being in abutment with said diaphragm substantially throughout the outer surface of the latter whereby the internal fluid pressure force against the closure means is borne substantially entirely by the outer cover member.

4. Pressure vessel means comprising a hollow cylinder having an open end and closure means therefor, a diaphragm welded marginally to the interior of said hollow cylinder inwardly of the open end thereof to seal the interior of said vessel, a diaphragm back-up plate likewise welded to the interior of said hollow cylinder and disposed immediately inwardly of said diaphragm, passage means to equalize fluid pressure at opposite sides of said back-up plate, an outer cover member having peripheral threaded engagement with said hollow cylinder at its open end, said outer cover member being in abutment with said diaphragm substantially throughout the outer surface of the latter whereby the internal fluid pressure force against the closure means is borne substantially entirely by the outer cover member.

5. Pressure vessel means comprising a hollow cylinder having an open end and closure means therefor, said vessel having an outwardly facing ledge spaced axially inwardly of the open end thereof, a diaphragm welded marginally to said ledge to seal the interior of said vessel from the space outwardly of said ledge, a diaphragm back-up plate supported by said ledge immediately inwardly of said diaphragm and likewise welded to said ledge, passage means to equalize fluid pressure at opposite sides of said back-up plate, and outer cover member and interfitting means acting between the outer cover member and said vessel to transmit outward pressure forces acting against the outer cover member to said vessel, said outer cover member being in abutment with said diaphragm substantially throughout the outer surface of the latter whereby the internal fluid pressure force against the closure means is borne substantially entirely by the outer cover member.

6. Pressure vessel means comprising a hollow cylinder having an open end and closure means therefor, said vessel having an outwardly facing ledge spaced axially inwardly of the open end thereof, a diaphragm welded marginally to said ledge to seal the interior of said vessel from the space outwardly of said ledge, a diaphragm back-up plate supported by said ledge immediately inwardly of said diaphragm and likewise welded to said ledge, passage means to equalize fluid pressure at opposite sides of said back-up plate, an outer cover member peripherally threaded to engage said hollow cylinder at its open end, said outer cover member being in abutment with said diaphragm substantially throughout the outer surface of the latter whereby the internal fluid pressure force against the closure means is borne substantially entirely by the outer cover member.

7. Pressure vessel means including an outwardly opening head member, an internal flange about said head member generally dividing the interior thereof into inner and outer chamber portions, a pass plate in said inner chamber portion and pass plate cover means seating over said pass plate to divide said inner chamber portion into inlet and outlet portions, said pass plate cover means seating on said flange and welded thereto and to said pass plate to seal said inlet and outlet inner chamber portions from each other, passage means from one of said inner chamber portions to the space above said cover means, a diaphragm overlying said pass plate cover means and welded marginally to said flange to provide a fluid seal for the inner chamber portions and the space above said pass plate cover means, and an outer cover member removably attached to said vessel and abutting said diaphragm substantially throughout the outer surface of the latter whereby the internal vessel pressure is borne substantially entirely by the outer cover member.

8. Pressure vessel means including an outwardly opening head member, an internal flange about said head member generally dividing the interior thereof into inner and outer chamber portions, a pass plate in said inner chamber portion and pass plate cover means seating over said pass plate to divide said inner chamber portion into inlet and outlet portions, said pass plate cover means seating on said flange and welded thereto and to said pass plate to seal said inlet and outlet inner chamber portions from each other, passage means from one of said inner chamber portions to the space above said cover means, a diaphragm overlying said pass plate cover means and welded marginally to said flange to provide a fluid seal for the inner chamber portions and the space above said pass plate cover means, the outer chamber portion having internal threads, and an outer cover member having external threads in engagement with said internal threads whereby the outer cover member abuts said diaphragm substantially throughout the outer surface of the latter whereby the internal vessel pressure is borne substantially entirely by the outer cover member.

9. Pressure vessel means including an outwardly opening head member, means forming a ledge about said head member generally dividing the interior thereof into inner and outer chamber portions, a pass plate in said inner chamber portion and pass plate cover means seating over said pass plate to divide said inner chamber portion into inlet and outlet portions, said pass plate cover means seating on said ledge and welded thereto and to said pass plate to seal said inlet and outlet inner chamber portions from each other, passage means from one of said inner chamber portions to the space above said cover means, a diaphragm overlying said pass plate cover means and welded marginally to said ledge to provide a fluid seal for the inner chamber portions and the space above said pass plate cover means, and an outer cover member removably attached to said vessel and abutting said diaphragm substantially throughout the outer surface of the latter whereby the internal vessel pressure is borne substantially entirely by the outer cover member.

10. Pressure vessel means including an outwardly opening head member, means forming a ledge about the interior of said head member, a pass plate in said head member and pass plate cover means seating over said pass plate to provide inlet and outlet chamber portions in said head member, said pass plate cover means seating on said ledge and welded thereto and to said pass plate to seal said inlet and outlet chamber portions from each other, passage means from one of said chamber portions to the space above said cover means, a diaphragm overlying said pass plate cover means and welded marginally to said ledge to provide a fluid seal for the inlet and outlet chamber portions and the space above said pass plate cover means, and an outer cover member removably attached to said vessel and abutting said diaphragm substantially throughout the outer surface of the latter whereby the outward pressure against said diaphragm is borne substantially entirely by the outer cover member.

11. Pressure vessel means including an outwardly opening head member, means forming a ledge about the interior of said head member, a pass plate in said head member and pass plate cover means seating over said pass plate to provide inlet and outlet chamber portions in said head member, said pass plate cover means seating on said ledge and welded thereto and to said pass plate to seal said inlet and outlet chamber portions from each other, passage means from one of said chamber portions to the space above said cover means, a diaphragm overlying said pass plate cover means and welded marginally to said ledge to provide a fluid seal for the inlet and outlet chamber portions and the space above said pass plate cover means, said head member being internally threaded outwardly of said ledge and an outer cover member threaded thereinto and abutting said diaphragm substantially throughout the outer surface of the latter whereby the outward pressure against said diaphragm is borne substantially entirely by the outer cover member.

12. Pressure vessel means including an outwardly opening head member, a pass plate in said head member and a pass plate cover means seating over said pass plate to provide inlet and outlet portions, said pass plate cover means being welded about its periphery to the interior of said head member and to said pass plate to seal said inlet and outlet chamber portions from each other, passage means from one of said chamber portions to the space above said cover means, a diaphragm overlying said pass plate cover means and welded marginally to the interior of said head member to provide a fluid seal for the inlet and outlet chamber portions and the space above said pass plate cover means, said pass plate cover means being adapted to support said diaphragm at its inner surface, and an outer cover member removably attached to said vessel and abutting said diaphragm substantially throughout the outer surface of the latter whereby the internal vessel pressure is borne substantially entirely by the outer cover member.

References Cited in the file of this patent

UNITED STATES PATENTS

| Number | Name | Date |
|---|---|---|
| 1,897,213 | Price et al. | Feb. 14, 1933 |
| 2,009,877 | Dodd | July 30, 1935 |
| 2,133,934 | Ericsson et al. | Oct. 18, 1938 |
| 2,219,659 | Price | Oct. 29, 1940 |
| 2,247,105 | Tinker | June 24, 1941 |
| 2,766,903 | Boni | Oct. 16, 1956 |